United States Patent
Payson

(10) Patent No.: US 8,384,413 B2
(45) Date of Patent: Feb. 26, 2013

(54) ANTI-TAMPERING OBSCURITY USING FIRMWARE POWER MIRROR COMPILER

(75) Inventor: Ellwood Payson, Fullerton, CA (US)

(73) Assignee: ISC8 Inc., Costa Mesa, CA (US)

( * ) Notice: Subject to any disclaimer, the term of this patent is extended or adjusted under 35 U.S.C. 154(b) by 22 days.

(21) Appl. No.: 13/018,253

(22) Filed: Jan. 31, 2011

(65) Prior Publication Data

US 2011/0193587 A1    Aug. 11, 2011

Related U.S. Application Data

(60) Provisional application No. 61/337,087, filed on Feb. 1, 2010.

(51) Int. Cl.
*H03K 19/00*    (2006.01)
(52) U.S. Cl. .............................. 326/8; 326/83
(58) Field of Classification Search .................. None
See application file for complete search history.

(56) References Cited

U.S. PATENT DOCUMENTS

| | | | |
|---|---|---|---|
| 6,624,773 B2* | 9/2003 | Wong | 341/136 |
| 2005/0050355 A1* | 3/2005 | Graunke | 713/201 |
| 2011/0132987 A1* | 6/2011 | Hoeksel et al. | 235/492 |

\* cited by examiner

*Primary Examiner* — Crystal L Hammond
(74) *Attorney, Agent, or Firm* — W. Eric Boyd, Esq.

(57) ABSTRACT

In a preferred embodiment of the invention, a mirror compiler is provided for each protected device or circuit resulting in a program that is embedded into the protected device's source code. The mirror compiler can be configured to have multiple selectable compilation parameters offering the programmer flexible options for mirrored power cancellations.

In the preferred embodiment, the mirror compiler comprises a digital-to-analog converter and a digital-to-analog load to sink current. These elements serve to define a complement of the normal (i.e., unprotected) programmed device's output current. The digital-to-analog load currents are output and thus act to cancel the expected variations in the currents of the protected programmed device.

15 Claims, 1 Drawing Sheet

ANTI-TAMPERING OBSCURITY USING FIRMWARE POWER MIRROR COMPILER

CROSS-REFERENCE TO RELATED APPLICATIONS

This application claims the benefit of U.S. Provisional Patent Application No. 61/337,087, filed on Feb. 1, 2010, entitled "Anti-Tampering Obscurity Using Firmware Power Mirror Compiler" pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention generally relates to the field of anti-tamper devices and methods to prevent or inhibit reverse engineering by an unauthorized user, such as side channel power analysis of an electronic circuit.

More specifically, the invention relates to electronic circuitry that operates in cooperation with existing device compiler outputs and generates a minor output that is used to cancel power fluctuations from a protected electronic circuit as seen external to the protected circuit.

2. Description of the Related Art

It is a known concern of military and commercial entities that reverse engineering and evaluation of an electronic circuit can occur when a proprietary electronic component or device (e.g., a microelectronic circuit) falls into enemy hands or into the possession of a business competitor. The U.S. government has expressly noted such a concern in a recent directive entitled, "DoD Directive 5200.39, Research and Technology Protection within the Department of Defense," issued in March 2002.

Military opponents or commercial competitors can gain an advantage by learning the operation and vulnerability of a circuit by electronic probing or by physically examining the circuit such as by toggling or testing the inputs and outputs of the circuit to understand, to duplicate it or to develop methods of defeating the circuit.

In view of the above concerns, methods and devices that inhibit the reverse engineering of an electronic circuit (referred to as a "protected circuit" or "protected device" herein) by obscuring on or more of its operational characteristics to an unauthorized user is needed. Such protection is desirable in that it minimizes the ability of an adversary to learn key features and functions of a protected circuit and possibly develop means to disable or copy the device or circuit.

Side channel power analysis is a method of unauthorized reverse engineering (i.e., "tampering" with) of an electronic circuit to identify its key operational circuit characteristics. This form of tampering essentially monitors circuitry power, voltage and/or current variations during various circuit operational modes. These operational variations will result in one or more power, voltage, and/or current variations on the power lines of the circuit in the form of measurable electromagnetic radiation.

Side channel power measurement techniques include direct current/voltage analysis and analysis of direct power drawn from the circuit of interest using, for instance, non-evasive electromagnetic measurement and analysis using an electromagnetic probe as an electronic test probe.

The disclosed method and device of the invention significantly obscures power, voltage and/or current operational variations of a protected circuit and therefore reduces or eliminates the ability of an unauthorized user to perform side channel power analysis tampering of the protected circuit.

The instant invention generally comprises a protected circuit "mirror compiler" that operates in conjunction with the protected circuit output. The mirror compiler outputs are used to obscure or "cancel out" power, voltage and/or current fluctuations as seen external to the protected circuit such as by electromagnetic measurement and analysis.

BRIEF SUMMARY OF THE INVENTION

A mirror compiler is provided for obscuring a predetermined operational characteristic of a protected device or circuit. The minor compiler operates as a program that is embedded into the source code of the protected device. The mirror compiler can be configured to provide multiple selectable compilation parameters as is known in the field of electronics and offers the device programmer flexible options for mirrored power, voltage and/or current cancellations.

In the preferred embodiment, the minor compiler of the invention comprises a digital-to-analog converter and a digital-to-analog load to sink the digital-to-analog output current.

The complement or inverse of the normal (i.e., unprotected) programmed device's output current is determined and input to the digital-to-analog converter of the invention to generate an output. The digital-to-analog load current is output to the digital-to-analog load and functions to cancel the expected variations in the current of the protected circuit or device.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following detailed description of the preferred embodiments which are presented as illustrated examples of the invention defined in the claims.

It is expressly understood that the invention as defined by the claims may be broader than the illustrated embodiments described below.

DETAILED DESCRIPTION OF THE INVENTION

Turning now to the figures wherein like numerals define like elements among the several views, a mirror compiler device and method for obscuring a predetermined operational characteristic of an electronic circuit or device to deter tampering such as by side channel power analysis is provided.

The mirror compiler of the invention works in cooperation with existing component-level or system-level device compilers to use executable code or to generate a predetermined mirror compiler output that is used to obscure or mask the protected circuit current draw profiles or both as seen external to the device under analysis.

The mirror compiler of the invention is readily implemented into a large number of existing complex programmable logic devices, (CPLDs), field programmable gate arrays (FPGAs), digital signal processors (DSPs) or microcontrollers. Desirably, the device and method of the invention can be implemented into any device whose source code is accessible and programmable by an authorized user.

Stated simply, the mirror compiler is used to monitor the output signal of a critical or predetermined device, determines and/or performs a current complement of the selected device signal, develops complementary source code representative of the current complement of the selected device signal, programs the device embedded with normal, operational compiler source code and sends the signal current complement to the digital-to-analog converter during operation of the programmed, protected device. The digital-to-analog converter of the invention receives its signal from the protected device, whose program was developed using the power mirror compiler.

The basic circuitry of the invention comprises means for generating the current complement of the output signal of a predetermined circuit, a digital-to-analog converter and a digital-to-analog load sharing a common current loop with the load of the protected circuit.

Figure 1:
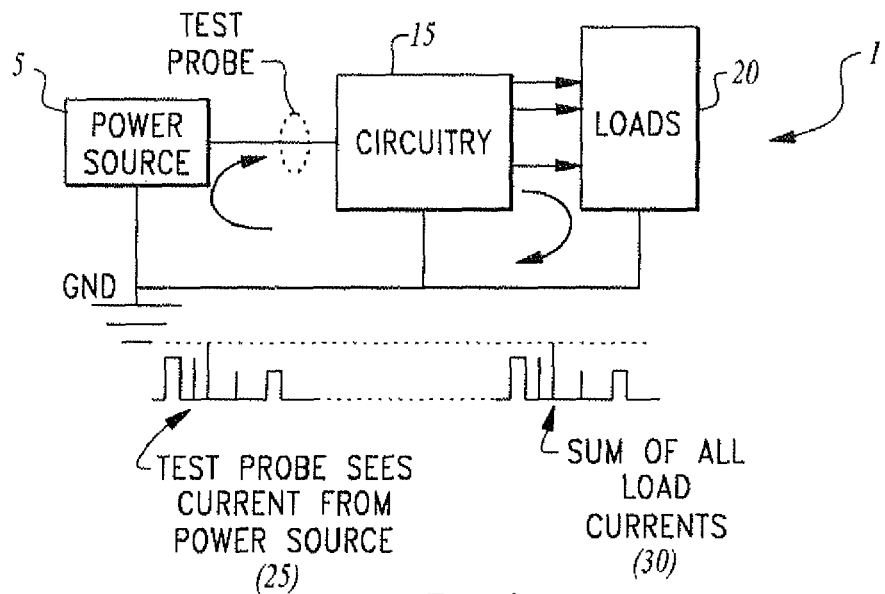
FIG. 1 is a block diagram depicting an unprotected circuit and showing the sum of the load currents on a power line as seen by a test probe.

In the prior art unprotected system 1 of FIG. 1 without a mirror compiler, a power supply or source 5 supplies electrical power and is in the current loop of the unprotected circuitry 15 and device loads 20.

In the operation of the exemplar unprotected circuitry 15, the execution of embedded code used for the normal operation of the circuitry and the driving of device loads 20 results in the summing of the device load currents 30 sunk by device loads 20. This, in turn, generates measurable power line variations 30 in protected system 1 that can be measured by test probe 25 by an unauthorized user.

The measured power line variations can be used to determine the function of the inputs and outputs or operational characteristics of unprotected circuitry 15 by an unauthorized user.

Figure 2:
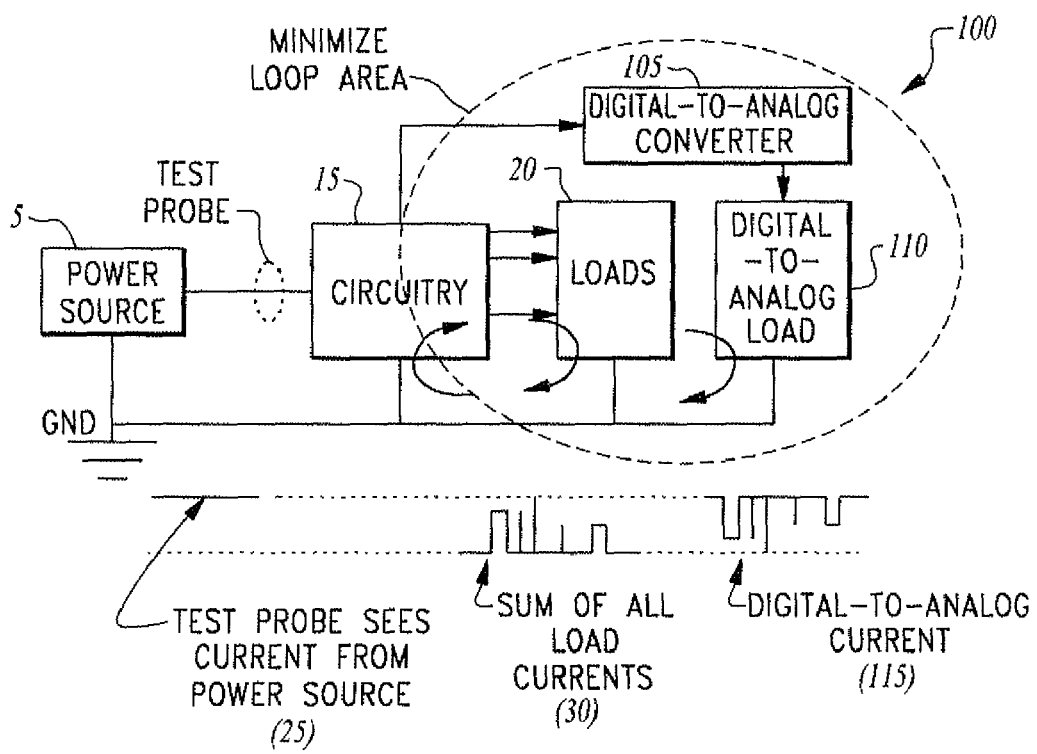
FIG. 2 is a block diagram depicting a protected circuit and showing the sum of the load currents and the digital-to-analog load currents on a power line as seen by a test probe.

In the preferred embodiment of the protected system incorporating the mirror compiler of the invention 100, the protected circuitry 15 of the invention of FIG. 2, a power supply or power source 5 supplies electrical power to protected circuitry 15 and loads 20 and is in the current loop therewith.

In similar manner to the prior art unprotected circuit above, the operation of protected circuit 15 includes the execution of embedded code for the normal operation of the device and the driving of loads 20 that results in the summing of the load currents 30 sunk by loads 20.

Concurrent with the execution of the embedded operational code of protected circuitry 15 of FIG. 2, the predetermined current complement of the embedded operational code is output to the digital-to-analog converter 105 of the invention. The digital-to-analog converter 105 drives an appropriate load, referred to as the digital-to analog load 110, within a predetermined range and functions to complement and therefore cancel out, the normal (i.e., expected) output current of protected circuitry 15.

The output waveform (i.e., the resulting current) complements and cancels the normal (i.e., expected) output current variation of the device.

The output of digital-to-analog converter 105 is received by digital-to-analog load 110 and generates a digital-to-analog output current 115. The digital-to-analog current 115 is in the current loop of the protected circuitry 15 and loads 20 such that load currents 30 and digital-to-analog current 115 are summed and act to cancel each other.

In this manner, the measured power line variations are cancelled or obscured and cannot be used to determine the function of the inputs and outputs or operational characteristics of an unidentified circuit by an unauthorized user.

The resolution, sample rate and other digital-to-analog converter parameters are determined by the specific application as is known in the electronic design arts.

The mirror compiler of the invention is not limited to the above embodiment and may desirably be configured for the obscuring of various programmed device operational parameters including, without limitation: 1) to mirror only selected signals, 2) to mirror only certain pre-defined signal groups, 3) to mirror non-differential signals, 4) to mirror only differential signals, 5) to mirror signals only within a predefined frequency range, 6) to mirror only within a certain pre-defined summed power range, or, 7) to implant erroneous power fluctuations that are frequency-based, mode/functional based, power-based or signal-based.

The precise functions implemented by any given mirror compiler are determined by the hardware implementation of the device, the existing device compilers features, and the system level performance requirements.

The mirror compiler operates in conjunction with the normal 'hardware' compiler of the selected device. In one embodiment the minor compiler transforms a high level set of commands into hardware specific assembly language 'mnemonics' executable by the unique mirror current load hardware of interest. This minor current load hardware can also be designed and integrated as part of the final hardware configuration. The mirror current load hardware may be integral to the component device or implemented external to the device at the board level.

Although a primary application of the invention is related to a mirror compiler for digital-type circuitry having discrete frequency components, the technique may also be implemented in the analog domain (continuous spectrum) and such implementation is within the scope of the invention. Circuitry, such as a phase-locked loop circuitry or PLL, has both analog and digital components. This technique can be implemented into such a circuitry and have a digital and an analog current mirror component.

In an alternative embodiment of a method of the invention, the steps comprise:

1) The determination of the unprotected circuit (or system) level 'current draw profile' resulting from its operational preprogrammed device compiler, 2) The mirroring of the current draw profile based on a set of predetermined mirror compiler attributes, 3) The generation of a set of mnemonics representative of the complement of the current draw profile and recognized by the unprotected circuit, to define a mirror compiler command set and, 4) The integration and execution of the minor compiler command set into the existing embedded machine code of the unprotected device during device operation.

The programmed protected device, the digital-to-analog converter and the associated circuitry are preferably located as close to one another as physically practical such as in a stack of integrated circuit chips. The current loop of the protected circuit is preferably minimized to the greatest extent possible. In this manner, circuitry power variations are maintained inside a relatively small, localized loop, thus minimizing variations of the source power lines (or radiation) external to the loop.

Many existing components (e.g., microcontrollers, DSPs) are provided with one or more on-board, internal digital-to-analog converters available. In these instances, these devices are readily and easily configured for mirrored power correction while desirably minimizing the current loop. In other device configurations where internal digital-to-analog converter circuitry is unavailable, external mirror circuitry can be implemented as part of a three-dimensional electronic component stack or integral to the device substrate.

In an alternative embodiment, using the method and device of the invention also allows a designer to "inject" algorithm-based erroneous (random) power fluctuations, making it difficult for a "hacker" to successfully tamper with the protected circuitry using side channel power analysis.

A key component or feature of the mirror compiler is the capability to configure its final performance based on any number of programmer pre-selected attributes as set forth below:

1. Frequency Range of Interest

Typically, digital circuit has discrete frequency components of multiple master clock divisors. One operator attribute is the determination of the range of masked frequencies whereby multiple ranges may be selected for obscuring.

2. Frequency Resolution of Interest

Typically, digital circuits have discrete frequency components of multiple master clock divisors. One operator attribute is the determination of the resolution of the masked frequencies whereby multiple ranges may be selected for obscuring.

3. Current Range of Interest

The programmer may select current ranges of interest for obscuring.

4. Current Digitization Resolution

The programmer may select resolution of currents for obscuring.

5. Noise Current Masking
   a. Gaussian (random)
   b. Periodic (cyclic)

6. Selective Variable Correction

Selecting a discrete compiler variable or output pin permits current obscuring of an individual line function.

7. Current Load Table

The programmer has the capability to define the current draw of any output line of interest for obscuring.

8. Real-Time Current Correction

If supported by the selected hardware device, the programmer may select a feature to allow hardware monitoring of the current draw and in real-time mirror compensate the load for obscuring.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A system for obscuring a current variation on a power line of a protected circuit comprising:
   a protected circuit having a protected load current,
   mirror compiler circuitry configured to generate and execute complementary source code that is configured to source the electric current complement of the protected load current to define a current complement concurrently with the sourcing of the protected load current during the execution of the code,
   the complementary source code being representative of a current complement of a predetermined protected circuit operation and configured to output the current complement of the predetermined protected circuit operation,
   digital-to-analog converter means configured to receive the current complement and convert it to a digital-to-analog output, and,
   a digital-to-analog load driven by the digital-to-analog output and having a digital-to-analog load current that is summed with the protected load current.

2. The protected circuit of claim 1 wherein the mirror compiler is implemented in a complex programmable logic device.

3. The protected circuit of claim 1 wherein the mirror compiler is implemented in a field programmable gate array.

4. The protected circuit of claim 1 wherein the mirror compiler is implemented in a digital signal processor.

5. The protected circuit of claim 1 wherein the mirror compiler is implemented in a micro-controller device.

6. The protected circuit of claim 1 wherein the mirror compiler is implemented in a three-dimensional electronic module.

7. The protected circuit of claim 1 wherein the mirror compiler is implemented as a separately provided circuit in electronic communication with the protected circuit.

8. A method for obscuring a current variation on a power line of a protected circuit comprising:
   providing a first protected electronic circuit having a first protected output signal representative of a protected circuit operational characteristic in electronic communication with a load having a protected load current,
   determining a current complement of the first protected output signal to define a second obscuring output signal using mirror compiler circuitry configured to generate and execute complementary source code that is configured to source the electric current complement of the protected load current to define a current complement concurrently with the sourcing of the protected load current during the execution of the code,
   the complementary source code being representative of the current complement of a predetermined protected circuit operation and configured to output the current complement of the predetermined protected circuit operation,
   inputting the second obscuring output signal to a digital-to-analog converter to generate a digital-to-analog output,
   driving a digital-to-analog load with the digital-to-analog output to define a digital-to-analog current, and,
   summing the digital-to-analog current with the load current.

9. The method of claim 8 wherein the operational characteristic comprises a predetermined set of protected outputs.

10. The method of claim 8 wherein the operational characteristic comprises only non-differential protected outputs.

11. The method of claim 8 wherein the operational characteristic comprises only differential protected outputs.

12. The method of claim 8 wherein the operational characteristic comprises protected outputs within a predetermined frequency range.

13. The method of claim 8 wherein the operational characteristic comprises protected outputs within a certain predetermined summed power range.

14. The method of claim 8 further comprising the steps of:
   executing code that is not representative of a predetermined operational characteristic of a protected circuit output load current to define a second obscuring output,
   inputting the second obscuring output to a digital-to-analog converter to generate a digital-to-analog output,
   driving a digital-to-analog load with the digital-to-analog output to define a digital-to-analog current,
   summing the digital-to-analog current with the first protected load current.

15. A method for obscuring a current variation on a power line of a protected circuit having executable compiler source code comprising:
   monitoring the output of a predetermined protected circuit signal,
   performing a current complement of the protected circuit signal using mirror compiler circuitry configured to generate and execute complementary source code that is configured to source the complement of the protected load current to define an electric current complement concurrently with the sourcing of the protected load current during the execution of the code,
   the complementary source code being representative of the current complement of a predetermined protected circuit operation and configured to output the current complement of the predetermined protected circuit operation,
   generating source code representative of the current complement of the protected circuit,
   programming the protected circuit with the generated source code, and,
   outputting the signal complement to a digital-to-analog converter during the operation the circuit.

* * * * *